United States Patent
Hori

Patent Number: 5,148,386
Date of Patent: Sep. 15, 1992

[54] ADDER-SUBTRACTER FOR SIGNED ABSOLUTE VALUES

[75] Inventor: Chikaharo Hori, Kanagawa, Japan

[73] Assignee: Kabushiki Kaisha Toshiba, Kawasaki, Japan

[21] Appl. No.: 533,146

[22] Filed: Jun. 5, 1990

[30] Foreign Application Priority Data

Jun. 6, 1989 [JP] Japan .................. 1-142233

[51] Int. Cl.⁵ .................................................. G06F 7/50
[52] U.S. Cl. ................................. 364/768; 364/787; 364/715.01
[58] Field of Search .......... 364/784, 787, 748, 715.01, 364/715.08, 768

[56] References Cited

U.S. PATENT DOCUMENTS

| | | | |
|---|---|---|---|
| 3,814,925 | 6/1974 | Spannapel | 364/748 X |
| 4,811,272 | 3/1989 | Wolrich et al. | 364/788 |
| 4,849,921 | 7/1989 | Yasumoto | 364/715.01 |
| 4,908,788 | 3/1990 | Fujiyama et al. | 364/715.08 |
| 4,953,115 | 8/1990 | Kanoh | 364/715.01 |
| 4,979,141 | 12/1990 | Gelinas et al. | 364/787 |

FOREIGN PATENT DOCUMENTS 63-310022 12/1988 Japan .

*Primary Examiner*—Tan V. Mai
*Attorney, Agent, or Firm*—Foley & Lardner

[57] ABSTRACT

An adder-subtracter for signed absolute values wherein two inputs of signed absolute values are operated with circuits based on the two's complement representation and the operated on result is output in the form of signed absolute value. The adder-subtracter executes two kinds of a subtractive operations for inputs in the form of signed absolute values in parallel. One of the operated results should then be selected according to the sign of the subtracted result, and inverted to be output depending on the sign so as to obtain a subtractive result directly in the form of a signed absolute value.

12 Claims, 14 Drawing Sheets

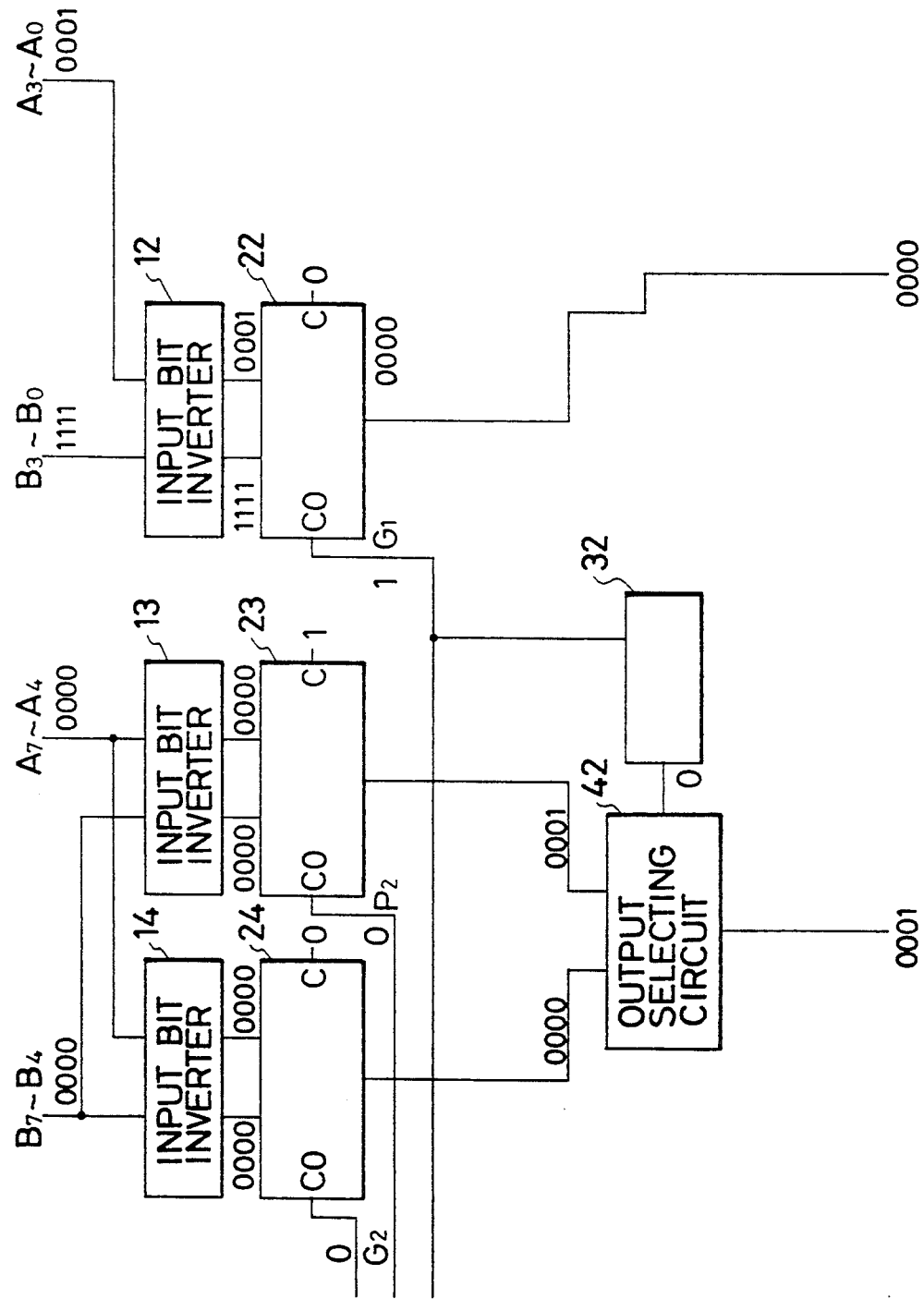

ADDER-SUBTRACTER FOR SIGNED ABSOLUTE VALUES

BACKGROUND OF THE INVENTION

1. Field of the Invention

This invention relates to an adder-subtracter for sign-magnitude representation, in which both inputs and outputs are signed absolute values.

2. Description of the Prior Art

Arithmetic calculation is one of the important applications of a computer. In the fields of structural analysis, fluid dynamics, thermodynamics and numerical analysis, the main tasks of computer operation are in multiplication, addition, and subtraction.

In the past, only specialists could deal with problems in those fields by means of computers. As prices of computers have been reduced, however, it has becomes more common place to use computers in such, analyses.

As the computer has become common, improvement in the main-machine interface is desired. As a result, techniques in image processing, signal processing, and/or computer graphics have become common. The main tasks of computers involved in those techniques are also multiplication, addition, and subtraction.

There are two requirements for progress of computer techniques in these fields. These are as follows.

(1) The requirement for high speed operation in multiplication, addition, and subtraction.

Because almost all of the tasks performed by computer involve multiplication, addition, and subtraction, high speed operation in these three arithmetic processes of course leads to high speed processing by computer. Therefore, there is a strong need for high speed computer processing by means of hardware; that is, an LSI which has high speed multipliers and adder-subtracters has been desired.

(2) The requirement for standardization.

Because of the popularization of computers, it is desirable that the operational results from different computers agree with each other. After the functions of multiplication, addition, and subtraction have been performed repeatedly, however, there may be differences in computing results, caused by difference in operating bit width. This is due to the accumulation of arithmetic errors. The representation of an integer number and a fixed-point number is standardized in the two's complement representation form, which is the essential idea of computer operation. There are, however, differences in bit numbers for the mantissa part and the exponent part in floating point representation amongst various computer makers. Therefore, operational errors have arisen, especially in floating point arithmetics.

Thus, the IEEE fixed a standard for floating point representation. This standard has become widely used. As a result, a strong need has arisen for an LSI having high speed multipliers and adder-subtracters, which meet the IEEE standard.

The floating point format of the IEEE standard (IEEE754) is comprised of a sign bit, an exponent part, and a mantissa part. A number is composed two parts: the sign bit and the calculated value from the absolute value represented by the mantissa and exponent.

Arithmetics, however, are carried out in general by the two's complement representation form. This is one of the essential ideas of computer operation. Most of computer hardware and most of development in arithmetic and logic units have been therefore, based on the two's complement representation.

It is thus..advantageous to design arithmetic and logic units according to the two's complement representation form when an out. In this way, prior research could be applied to the design of arithmetic and logic units.

When an addition or a subtraction is carried out under the floating point, IEEE format, mantissas readjusted by means of a barrel shifter and then are fed to an arithmetic circuit to carry out the calculation. In this way, the input signals are in the form of sign-magnitude representation in the IEEE format. The input signals should therefore be converted into signals in the two's complement representation form before these are input to a circuit for addition and subtraction. It is, however, possible to carry out an addition or a subtraction with absolute value inputs and signs without converting them into the two's complement representation form, if the conversion form for arithmetics shown in Table 1 is used.

TABLE 1

| A | B | A + B | A − B |
|---|---|-------|-------|
| + | + | $|A| + |B|$ | $|A| - |B|$ |
| + | − | $|A| - |B|$ | $|A| + |B|$ |
| − | + | $|B| - |A|$ | $-(|A| + |B|)$ |
| − | − | $-(|A| + |B|)$ | $|B| - |A|$ |

In this way, however, the output signals from a circuit for addition or subtraction are based on the two's complement representation. It is, therefore, necessary to convert the output signals into sign-magnitude representation again.

In the two's complement representation, an operating result agrees with that in absolute value representation when the result is positive. It is not, therefore, necessary to convert the result when it is positive. On the other hand, it is necessary to convert the result when it is negative. The conversion to obtain an absolute value output is as follows. When the operational result in the two's complement representation form is negative, 1 is subtracted from the output first; and every bit of the subtracted result is inverted to obtain an absolute value. The result of addition of two absolute values is never negative. The question, then, is what to do when the subtracted result is negative.

Three methods to solve the question could be considered as follows:

1. An operation result will be converted when the result is negative.

2. A size comparison between two absolute values is carried out before inputting them into an arithmetic unit. When it is expected from the comparison that the arithmetic result will be negative, a subtrahend and a minuend are replaced by each other.

3. A subtraction is carried out in parallel to the execution of an ordinary subtraction in which a subtrahend and a minuend are replaced by each other. The positive one of the two results should then be taken as a correct result.

Using method 1 above, hardware to convert the operation result is required. In order to convert a negative number in the two's complement representation form into an absolute number, it is necessary first to subtract 1 from the negative number; and to invert every subsequent bit of the result. A decrementer, therefore, is needed to subtract 1 from the negative result. In this decrementer, borrows should also be transmitted between each digit.

Using method 2 above, hardware, such as a size comparator, is needed. In general, a size comparator obtains a result by transmitting every bit of the comparison result between each digit. Signal transmissions are therefore required between each digit. Because of this transmission, the operation time using this method becomes relatively long.

As mentioned above, time additional to ordinary hardware operation time is required to perform a subtraction. Thus, methods 1 and 2 are not suitable for aohieving high speed operation.

Using method 3 above, a suitable result could be selected from the two results. Additional time to perform a subtraction is not required, but an additional adder-subtracter is needed, operating in parallel with the other one. The increase in hardware will be great.

In the three methods described above, there is no way to improve operational speed, especially for additions. In order to improve operational speed in additions, it is necessary to improve the operational speed of the circuits. Especially in the third method, there is not much difference in operational speeds between addition and subtraction operations. Therefore, it is necessary to improve the operational speed of the circuits for addition and subtraction, in order to improve the system'operational speed. Generally speaking, an increase in hardware is required to improve the operation speed of circuits. In the third method mentioned above, a significant amount of increase in hardware is needed to improve the circuit operation speed, because the system required for this method must have two of the same circuits. Furthermore, one of the circuits is not used at all for addition. As a result, the utility efficiency of hardware is lower in this system.

SUMMARY OF THE INVENTION

An object of the present invention is to provide an adder-subtracter for sign-magnitude representation, in which an addition or a subtraction of sign-magnitude representation can be executed in the two's complement representation form without greatly increasing hardware.

Another object of the present invention is to provide an adder-subtracter for sign-magnitude representation, in which an addition or a subtraction of sign-magnitude representation can be executed in the two's complement representation form without slowing the oepration.

Still another object of the present invention is to provide an adder-subtracter for sign-magnitude representation, in which high speed addition can be executed without using special hardware.

In the first aspect of the present invention, there is provided an adder-subtracter for sign-magnitude representation in which an addition or subtraction of sign-magnitude representation is executed in the two's compliment representation form and the executed result is output as sign-magnitude representation, comprising: a first arithmetic circuit to execute an ordinary subtractive operation in the two's complement representation form in which 1 is added to the addition result between an inverted subtrahend and a minuend in subtraction; a second arithmetic circuit to execute an addition between an inverted subtrahend and a minuend in subtraction without adding 1 to the executed result; a sign-generating circuit to determine the sign of the subtraction result in the first arithmetic circuit; an output-selecting circuit to select either one of the two outputs from the said first and second arithmetic circuits, according to the output from the sign-generating circuit; and an output inverter, which executes a bit-inversion of the output from the output-selecting circuit, according to the output from the sign generating circuit.

In a second aspect of this invention, there is provided an adder-subtracter for signed absolute values, in which an addition or subtraction of signed absolute values is executed in the two's complement representation form, and the executed result is output as a signed absolute value, comprising: an input bit inverter in which an addend is output without being inverted in addition, and a subtrahend is inverted to be output in subtraction; a first arithmetic circuit to execute an ordinary subtractive operation in the two's complement representation form in which 1 is added to the result of adding between the output from the input bit-inverter and an augend or a minuend in a subtraction; second arithmetic circuit to execute addition between the output from the input bit inverter and an augend or a minuend in subtraction without adding 1 to the executed result; a sign-generating circuit to decide whether the operation is addition or subtraction, and to decide the sign of the operational result in the first arithmetic circuit; an output-selecting circuit in which an output from the second arithmetic circuit is selected to be output when the operation is decided to be addition, or when the operation is subtraction and the operational result in the first arithmetic circuit is negative decided by the sign generating circuit, and in which an output from the first arithmetic circuit is selected to be output in other situations, and an output bit-inverter, in which an output from the output-selecting circuit is bit-inverted to be output when the operation is decided to be subtraction and the output from the first arithmetic circuit is negative 12 decided by the said sign-generating circuit, and in which an output from the output-selecting circuit is not bit-inverted in other situations.

According to the first and second aspects of this invention, an ordinary subtractive operation is executed in the first arithmetic circuit. At the same time, a second subtractive operation, that is, in which 1 is not added to the addition result between an inverted subtrahend and a minuend, is executed in the second arithmetic circuit. One of these two arithmetic results is, then, chosen as a correct output in the output selecting circuit according to the sign of the subtraction result in the first arithmetic circuit. The selected result is, then, inverted in the output inverter according to the sign of the subtraction result in the first arithmetic circuit to obtain an arithmetic result in the absolute value representation form.

Thus, an arithmetic result is obtained in the absolute value representation by the adder-subtracter according to the first and second aspects of this invention, without performing subtraction of 1 from an arithmetic result in the two's complement representation form, even if the result is negative. As a result, addition or subtraction for signed absolute values can be executed in the two's complement representation form, without increasing hardware greatly, and without slowing the operational speed.

According to the second aspect of this invention in particular, an input bit inverter, which is included in the first and second arithmetic circuits separately in the adder-subtracter, according to the first aspect of this invention, is designed to be used in common for the first and second arithmetic circuits. It is, therefore, possible to further decrease additional hardware in the adder-subtracter, according to the second aspect of this invention.

In the third aspect of this invention, there is provided an adder-subtracter for signed absolute values in which addition or subtraction of signed absolute values is executed in the two's complement representation form, and the executed result is output as a signed absolute value, comprising: an input bit inverter, in which an addend is output without being inverted in addition and a subtrahend is inverted to be output in subtraction; a signal-generating circuit to decide on the existence of a carry and the necessity of a carry transmission after adding the output from the input bit-inverter and an augend or a minuend; a first carry-calculating circuit in which a carry operation for each bit of input from the signal-generating circuit is executed with a carry from a lower digit; a second, carry-calculating circuit, in which a carry operation for each bit of input from the signal-generating circuit is executed without a carry from a lower digit; a sign-generating circuit, in which the carrys from the highest digits of the first and second carry-calculating circuits are input to find the sign of a subtraction result; an output-selecting circuit to select either one of the outputs of the first or second carry-calculating circuits, according to the output from the sign-generating circuit; and an output circuit to which either one of the outputs of the first and second carry-calculating circuits selected by the output-selecting circuit and the carry generated by the signal-generating circuit are input to produce a final adding result, and in which the input carry or the adding result is bit-inverted when the sign of the subtraction is determined to be negative.

According to the third aspect of this invention, for the most part the first and second arithmetic circuits, described in the first and second aspects of this invention, other than the first and second carry calculating circuits are designed to be used in common for the two kinds of subtractive operation mentioned above. It is, therefore, possible to further reduce the hardware in the adder-subtracter, according to the third aspect of this invention.

These and other objects, features and advantages of the present invention will be more apparent from the following description of preferred embodiments, taken in conjunction with the accompanying drawings.

BRIEF DESCRIPTION OF THE DRAWINGS

FIGS. 6a to 6c are block diagrams showing the operational procedure of the fifth embodiment.

DETAILED DESCRIPTION OF THE EMBODIMENTS

Figure 1:
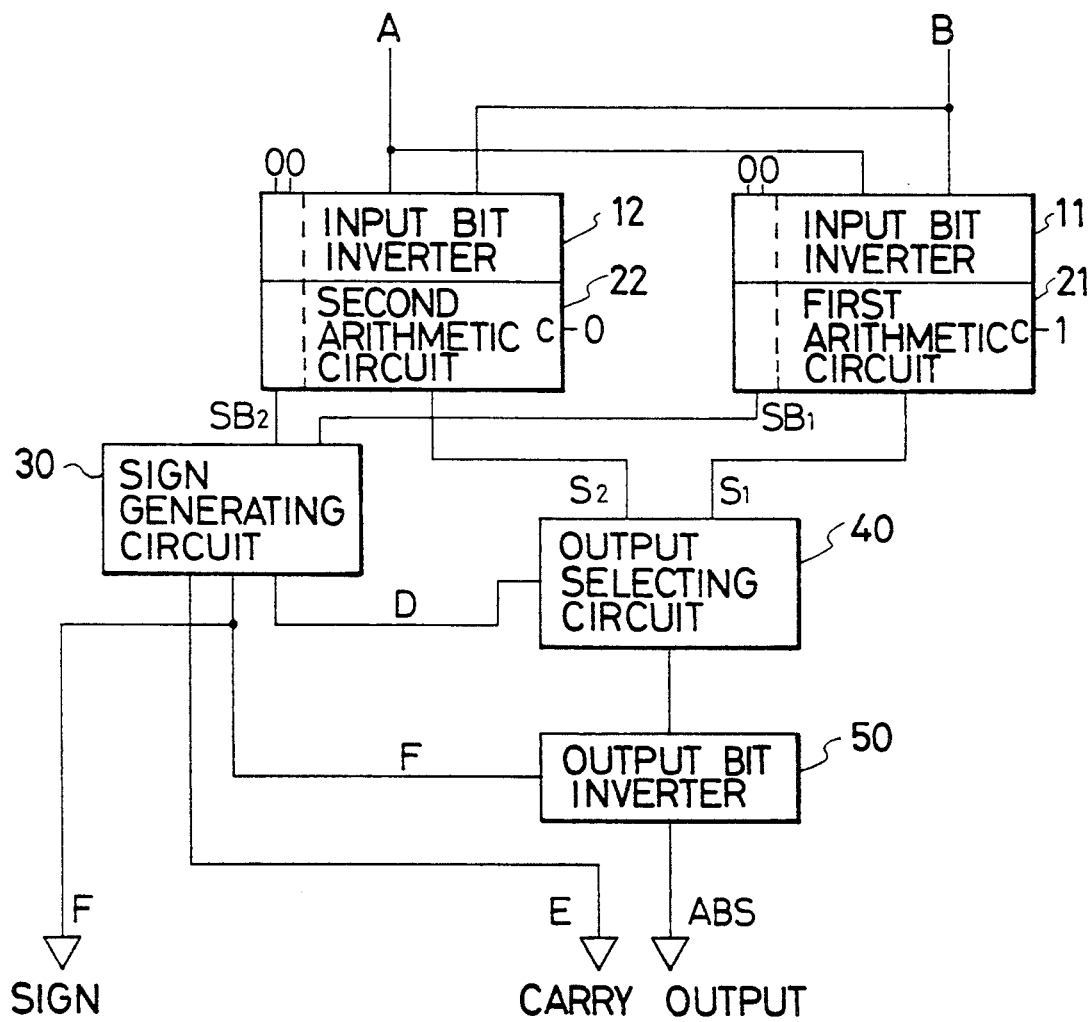
FIG. 1 is a block diagram showing the first embodiment of this invention.

In the embodiment shown in FIG. 1, an adder-subtracter is comprised of a first arithmetic circuit 21 and a second arithmetic circuit 22. The first arithmetic circuit 21 has an input bit inverter 11, which inverts every input bit according to the signs of two absolute value inputs A and B. This circuit 21 executes an operation in the two's complement representation form, in which an inverted subtrahend is added to a minuend and 1 is added again to the sum in subtraction. This "adding 1" operation means that there is a carry from a lower digit in the subtraction. The second arithmetic circuit 22 has an input bit inverter 12, which is similar to the inverter 11. This circuit 22 executes an arithmetic operation in which only an inverted subtrahend is added to a minuend in subtraction. In this operation an addition of one is not executed because there is no carry from a lower digit.

Assuming that the first and second arithmetic circuits 21, 22 have 4 digits, for example, one bit will be added as an expanded bit in a higher position, next to the highest digit and this is maintained 0 in an ordinary condition. In subtraction outputs $SB_1$ and $SB_2$ from the expanded bits will be output to sign-generating circuit 30.

The sign-generating circuit 30 finds the sign of the first arithmetic circuit 21 in subtraction. When the output from the expanded digit of the circuit 21 is one, the sign generating-circuit 30 finds the operational result in the circuit 21 as negative, and outputs a signal to an output selecting circuit 40. The output-selecting circuit 40 decides which of the operational results $S_1$ and $S_2$ from the first arithmetic circuit 21 or, the second arithmetic circuit 22 should be selected for an output. This circuit 40 selects as an output the operational result $S_2$ from the second arithmetic circuit 22 when the input from the sign generating circuit 30 is negative. Otherwise, the circuit 40 selects the operational result $S_1$ from the first arithmetic circuit 21 and outputs it to the output bit inverter 50.

When the subtraction result is negative, the output bit inverter 50 obtains from circuit 30 a signal F showing a negative result, and inverts every bit of the selected output from the output-selecting circuit 40, an outputting an absolute value.

Figure 7:
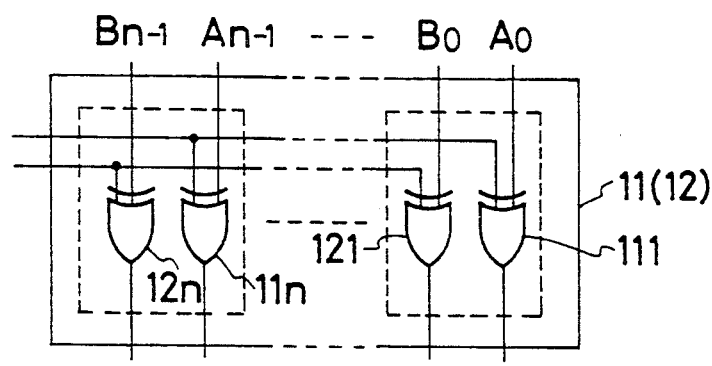
FIG. 7 shows a logic circuit of the input bit inverter in the first embodiment.
Figure 8:
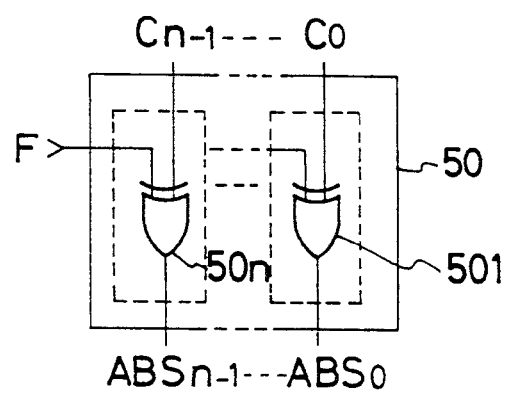
FIG. 8 shows a logic circuit of the output bit inverter in the first embodiment.

The input bit inverters 11, 12 are comprised as shown in FIG. 7. In other words, both inverters 11 and 12 have exclusive OR gates 111; 121, ⋯, 1ln; 12n for each bit $A_0-A_{n-1}$; $B_0-B_{n-1}$, when the absolute values of A and B have n bits. The output bit inverter 50 can also be comprised as shown in FIG. 8. This is comprised of exclusive OR gates 501, ⋯ 50n for outputs $ABS_0$-$ABS_{n-1}$.

Figure 9:
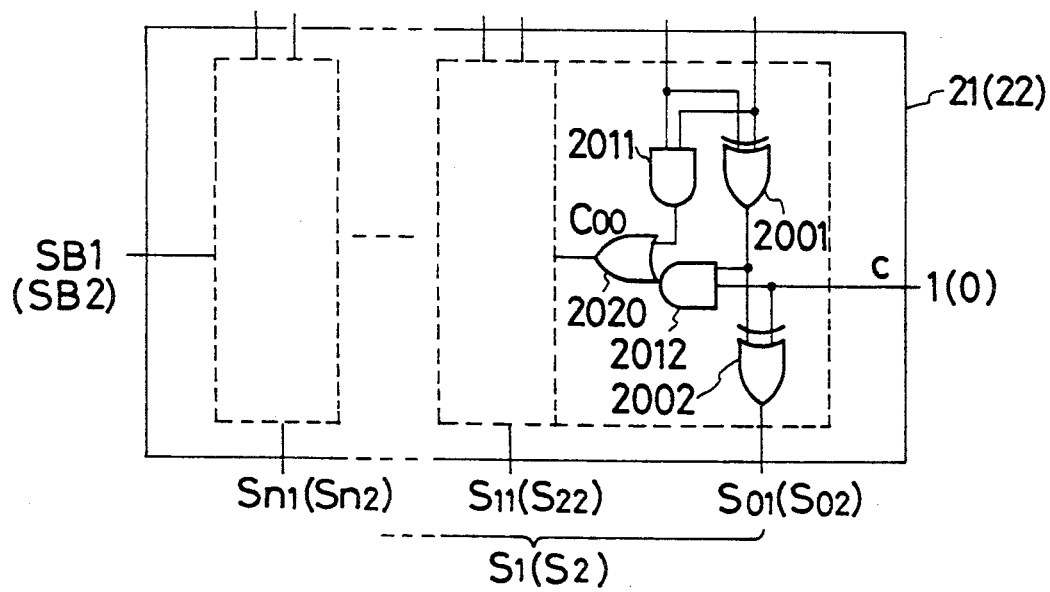
FIG. 9 shows a logic circuit of the first and the second arithmetic circuit in the first embodiment.

As shown in FIG. 9, the first and second arithmetic circuits 21, 22 have an exclusive OR gate 2001 and an AND gate 2011 respectively, in which the outputs from each bit of the input bit inverters 11 and 12 are introduced in parallel; respectively. The gate 2001 carries out an addition without carry for the two inputs the AND gate 2011, on the other hand it calculates to find the generation of a carry. A gate 2002 is also provided to execute addition without carry between the output from the exclusive OR gate 2001, as well as a carry C from a lower digit. The output from this gate 2002 is considered to be an output $S_{01}$ (or $S_{02}$) in the 0th digit bit. An AND gate 2012, into which the carry signal C from a lower digit and the output from the exclusive OR gate 2001 are input, is provided to find the further generation of a carry. If there is a carry in either one of the two outputs from the AND gate 2011 and the said AND gate 2012, a carry $C_{00}$ is output through the OR gate 2020 to a higher digit.

The connection of the logic circuit mentioned above is composed in the same way as explained above for each of the higher bit. 1, 2, . . . , n. The carry $SB_1$ (or $SB_2$) in the extended bit n, the highest digit, is introduced into the sign generating circuit 30.

Figure 10:
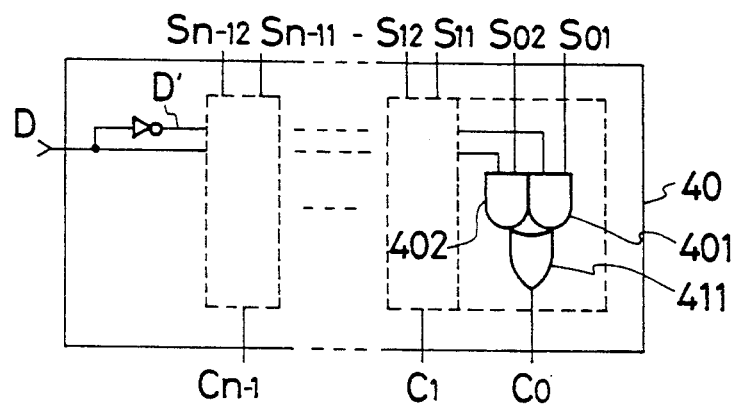
FIG. 10 shows a logic circuit of the output-selecting circuit in the first embodiment.

As shown in FIG. 10, in the output selecting circuit 40, the output from the second arithmetic circuit 22 is selected to be output, in an addition procedure. This output from the circuit 22 is also selected when the selecting signal D is one, that is, when a subtrahend is greater than a minuend in subtraction. On the other hand, when a subtrahend is smaller than a minuend, 1 is selected as the selecting signal D, that is, the signal D is 0. In this case, the output from the first arithmetic circuit 21 is selected to be output.

Figure 11:
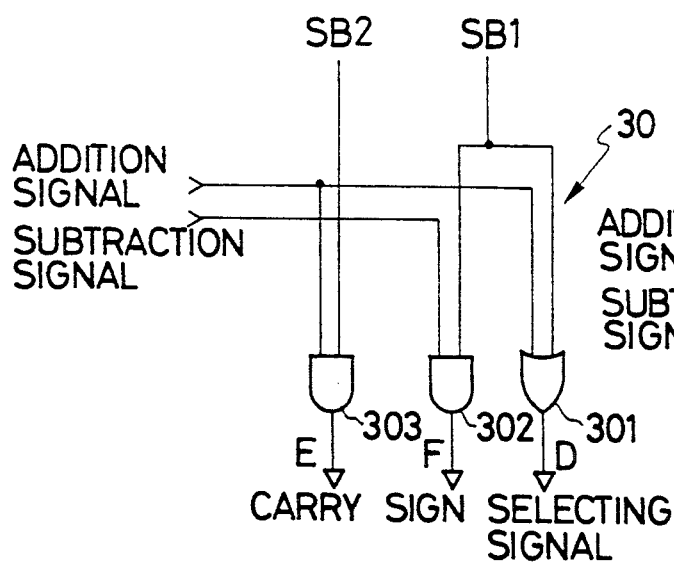
FIG. 11 shows a logic circuit of the sign-generating circuit in the first embodiment.

The sign generating circuit 30 is comprised of three AND gates 301, 302 and 303, as shown in FIG. 11. A signal for addition and a signal for subtraction from outside of the circuit, along with the bit signal $SB_1$ from the highest extended bit in the first arithmetic circuit 21, as well as the bit signal $SB_2$ from the highest extended bit in the second arithmetic circuit 22 are introduced into those AND gates 301, 302, and 303 as shown in the figure. As a result, the gate 303 outputs a carry E for a higher bit when 1 appears as the highest bit signal $SB_2$ from the second arithmetic circuit 22 in subtraction. The gate 302 outputs a bit-inverting (sign) signal F to the output-inverter 50, by finding a negative sign after 1 appeares as the highest bit signal $SB_1$ from the first arithmetic circuit 21, in subtraction. The gate 301 outputs a selecting signal D to select the operational result from the second arithmetic circuit 22 when addition is carried out, or when 1 appears in the highest bit of the first arithmetic circuit 21, in subtraction.

The operational procedure of the adder-subtracter for signed absolute values described above will be explained hereinafter.

In an addition procedure, input absolute values A and B are added to each other in both the first and second arithmetic circuits 21 and 22, without being inverted by the input-bit inverters 11 and 12 as shown in FIG. 1. The output-selecting circuit 40, then, selects the operational results from the second arithmetic circuit 22, according to the selecting signal D. This selected result is output through the output bit inverter 50, without being inverted. When 1 appears in the extended bit $SB_2$ of the second arithmetic circuit 22, it is thought that a carry has been produced; and the carry E is output to a higher bit from the sign generating circuit 30.

When subtraction ($|A|-|B|$) for absolute values A and B is carried out, every bit of the subtrahend B is inverted by the input bit inverters 1 and 12, leaving the minuend A as it is. the inverted subtrahend B is, then, introduced into the first and second arithmetic circuits 21 and 22.

In the first arithmetic circuit 21, the bit inverted subtrahend B is added to the minuend A. At the same time a carry, 1, from a lower digit is also added to execute ordinary subtraction in the two's complement representation form. The operational result $S_1$ is then output from the circuit 21. In the second arithmetic circuit 22, the bit inverted subtrahend B is added to the minuend A without executing add-one operation. As the result, $S_2$ is output from the second arithmetic circuit 22.

In a case where the minuend $|A|$ is smaller than $|B|$ that is, the operational result from the first arithmetic circuit 21 is negative, a signal 1 is output as the signal $SB_1$, showing a negative result to the sign generating circuit 30. The sign-generating circuit 30, then, generates the selecting signal D to select the operational result,.from- the second arithmetic circuit 22. This signal D is output to the output-selecting circuit 40. At the same time, a bit inverting signal F is ,alsp generated from the sign generating-circuit 30, and output to the output bit-inverter 50.

As a result, the output-selecting circuit 40 selects the operational result $S_2$ from the second arithmetic circuit 22. The output bit inverter 50 inverts the bits of the result $S_2$, and outputs them as an absolute value ABS.

As described above, an inverted value of the operational result $S_2$ from the second arithmetic circuit 22 is selected to be output directly as an absolute value output, when the subtrahend $|B|$ is greater than the minuend $|A|$. In general, 1 must be added to an inverted subtrahend to execute subtraction by the two's complement representation form, and 1 must be subtracted again to convert the subtracted result in the two's complement representation form into an absolute value. However, this operation is not needed for the adder-subtracter, according to this embodiment as described above.

In subtraction mentioned above, the sign-generating circuit 30 outputs 1 as the sign signal F to indicate a negative result. As a result, a signed absolute value is output from the adder-subtracter.

On the other hand, the subtracted result ($|A|-|B|$) in the case $|A| \geq |B|$ becomes positive. the sign generating circuit 30, therefore, outputs 0 as the selection signal D to the output selecting circuit 40 in order to select the operational result from the first arithmetic circuit 21. At the same time, 0 is output as the inverting signal F to the output bit inverter 50. The subtracted result $S_1$ from the first arithmetic circuit 21 of the two's complement representation form is, then, obtained as the signed absolute value ABS. The sign signal F becomes 0 in this case, indicating a positive result, As mentioned above, two kinds of subtractive operational are carried out in parallel, in this adder-subtracter. One of them is that 1 should be added to the added result between an inverted subtrahend and a minuend. This is an ordinary subtractive operation in the two's complement representation form. The second one is that an inverted subtrahend is added to a minuend without executing the add-1 operation. In this case, the operational result should be inverted to be output again. Either one of the operational results is, then, selected to be output as an absolute value of a subtraction result. A positive or negative sign is, then output for the selected result. Thus, a subtraction result in the absolute value representation form is obtained in the adder-subtracter, according to the first embodiment of this invention.

Figure 2:
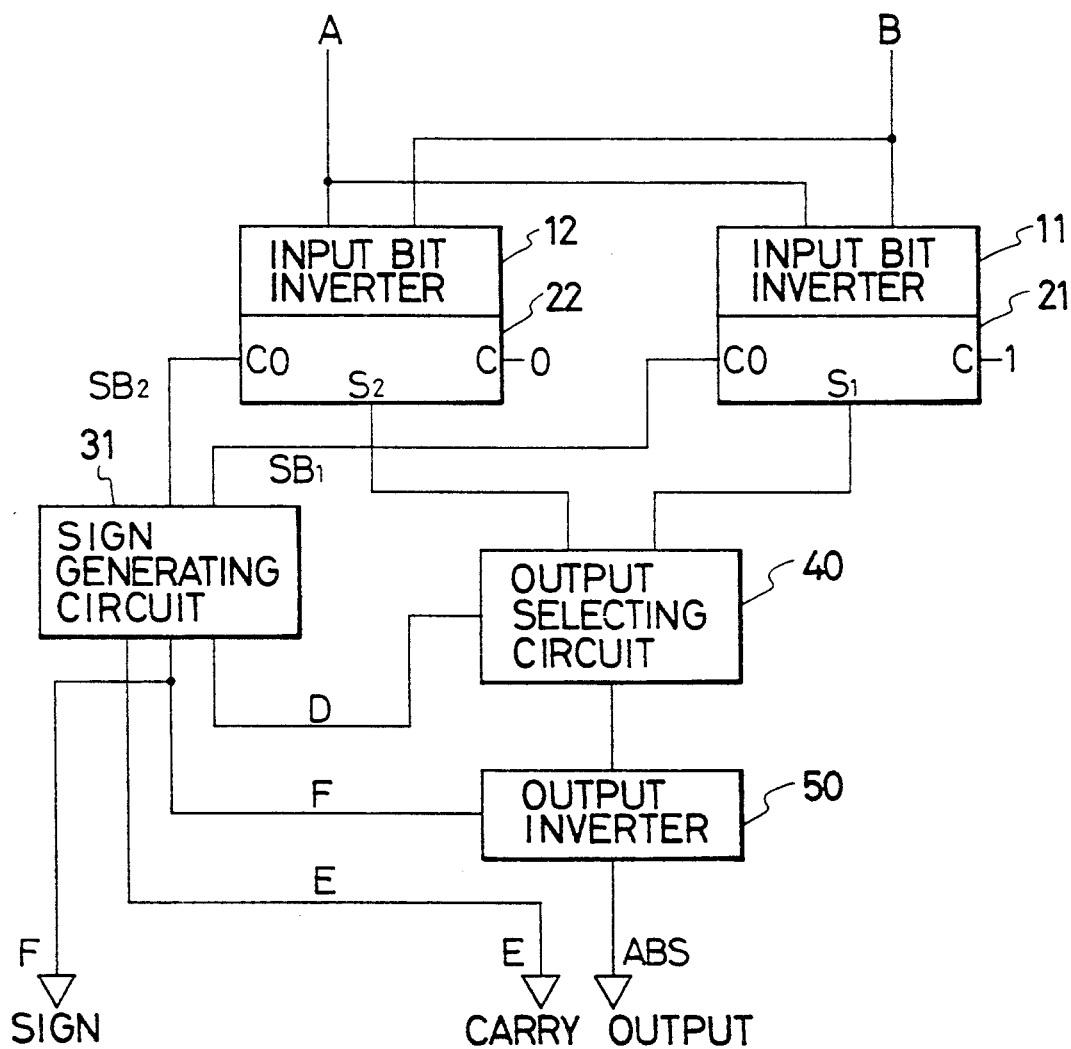
FIG. 2 is a block diagram showing the second embodiment of this invention.

FIG. 2 shows the second embodiment of this invention. In this embodiment, the sign-finding method differs from that of the said first embodiment. Unlike the first embodiment, the adder-subtracter according to the second embodiment does not have extended bits for signs in the first and second arithmetic circuits 21 and 22. In this embodiment, the sign of an arithmetic result is obtained from the carry in the highest digit of the first arithmetic circuit.

Figure 12:
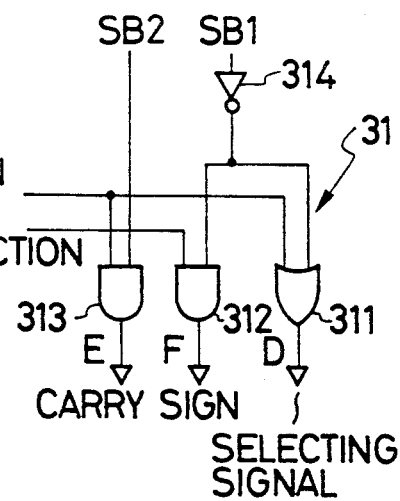
FIG. 12 shows a logic circuit of the sign-generating circuit in the second embodiment.

The sign generating circuit 31 of this embodiment, is comprised of the logic circuit shown in FIG. 12. The sign of addition or subtraction is obtained from the carry $SB_1$ in the highest digit of the first arithmetic circuit 21. In other words, when the carry $SB_1$ in the highest digit of the first arithmetic circuit 21 is 0, 1 is output from the inverter circuit 314, and supplied to the OR gate 311. 1 is thus output as the selection signal D from the gate 311, and supplied to the output-selecting circuit 40 to select the operational result $S_2$ of the second arithmetic circuit 22.

In a case where a subtrahend is greater than a minuend in absolute values, the output selecting circuit 40 chooses the output $S_2$ from the second arithmetic circuit 22, and gives it to the output bit inverter 50. Because the sign signal F is 1 in this case, the output bit inverter 50 executes bit-inversion to output a correct subtraction result ABS.

Figure 3:
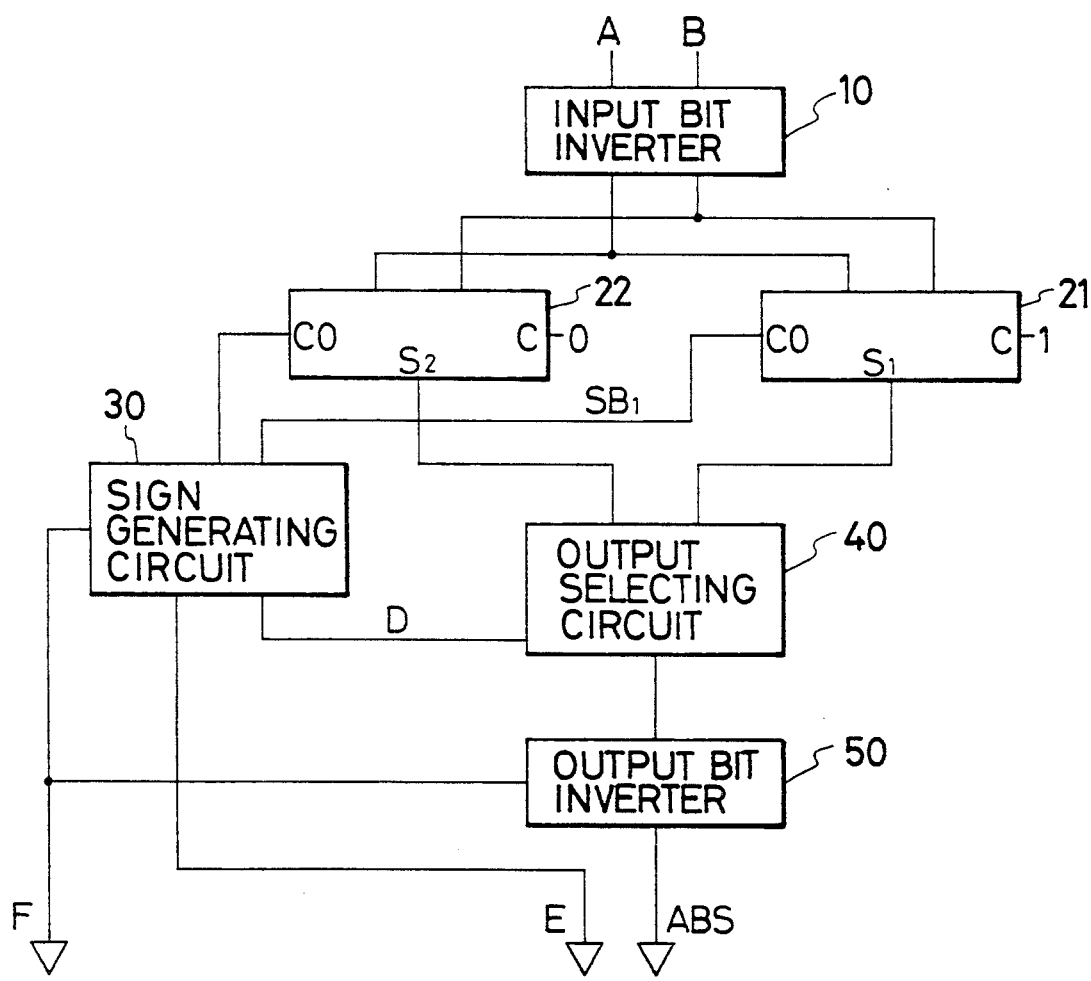
FIG. 3 is a block diagram showing the third embodiment of this invention.

FIG. 3 shows the third embodiment of this invention. In this embodiment, the input bit inverters 11 and 12 in the second embodiment are used in common by the first and the second arithmetic circuits 21 and 22. In other words, two absolute values are input into the first and second arithmetic circuits 21 and 22 through the input bit inverter 10, as shown in FIG. 3.

The input absolute values $|A|$ and $|B|$ are, therefore, given supplied to the first and second arithmetic circuits 21 and 22 after these values are inverted by the input bit inverter 10, according to their signs and an indicating signal for addition or subtraction. Which of the operational results from the first and second arithmetic circuits 21 and 22 should be chosen is determined by the same process as is used in the second embodiment.

Figure 4:
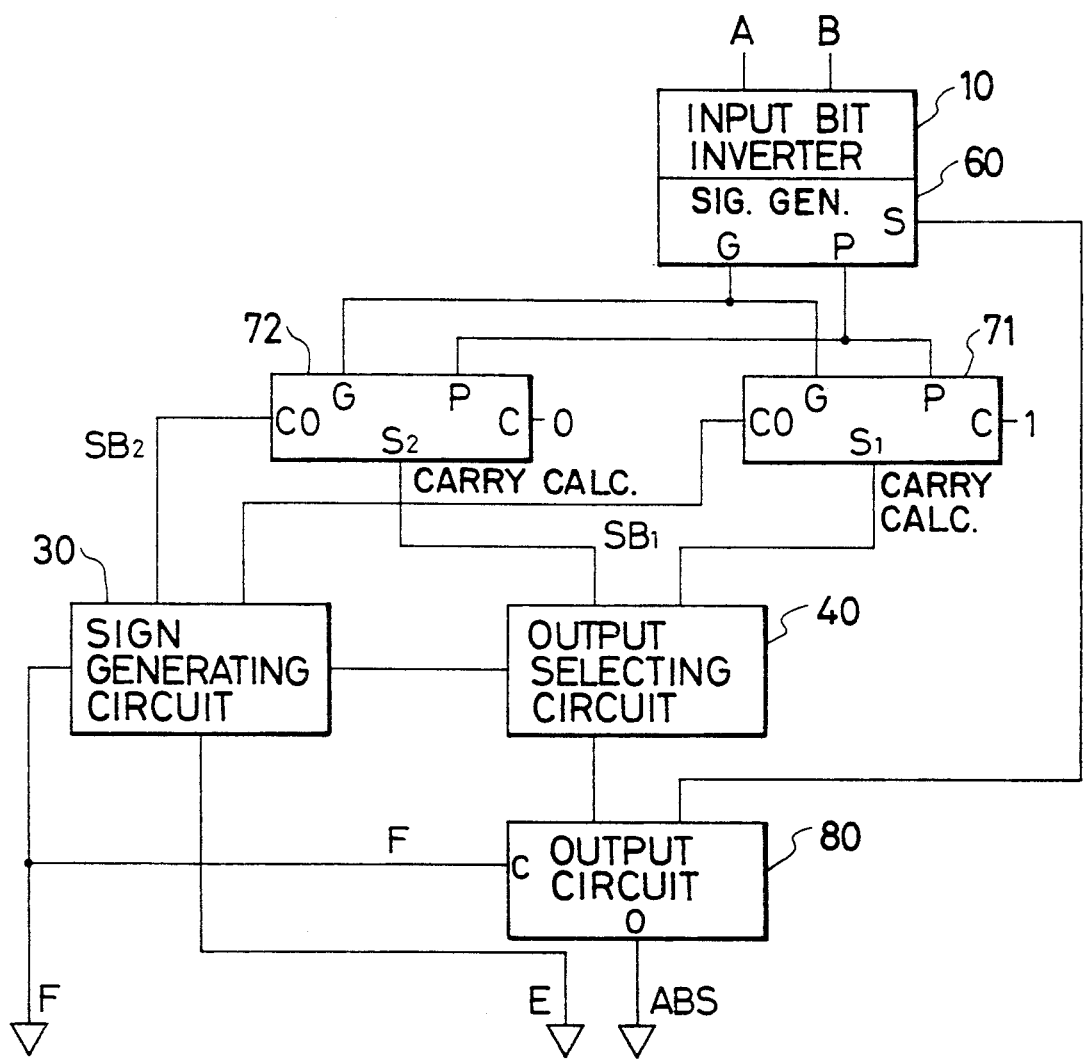
FIG. 4 is a block diagram showing the fourth embodiment of this invention.

FIG. 4 shows the fourth embodiment of this invention. In this embodiment, a part of the first and second arithmetic circuits 21 and 22 of the first, second and third embodiments are used in common to decrease the total amount of required hardware. In fact, a first carry-calculating circuit and a second carry-calculating circuit are provided assuming both cases whether or not there is a carry from a lower digit. Using these circuits, a carry calculation is executed first and either one of the two outputs from the circuits is selected as an output according to the signs of the outputs. The last result of an addition or a subtraction, then, is generated using the selected output. As a result, a large part of the first and the second arithmetic circuits in the first, second and third embodiments are used in common in this embodiment.

Figure 13:
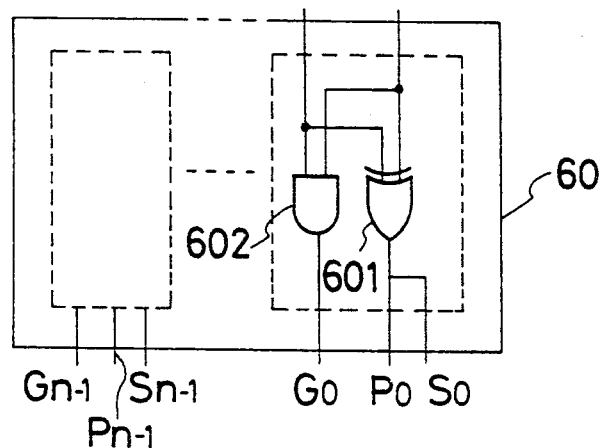
FIG. 13 shows a logic circuit of the signal-generating circuit in the fourth embodiment.

In the fourth embodiment, a signal-generating circuit 60 for a carry-generating signal P and a carry-transmitting signal G is connected to the input bit inverter 10. This circuit 60 is comprised of the sets of an exclusive OR gate 601 and an AND gate 602 for each bit. The carry-generating signals P and carry-transmitting signals D for each bit are generated by the circuit 60, as shown in FIG. 13. The first and second carry calculating circuits 71 and 72 are also present in the fourth embodiment. Each bit of the outputs P ($P_0$, ··· $P_{n-1}$) and G ($G_0$, ··· $G_{n-1}$) from signal generating circuit 60 is input to the circuits 71 and 72 to calculate a carry with carry inputs C (=1, 0) from a lower digit. The carry signals $SB_1$ and $SB_2$ in the highest bits of these circuits 71 and 72 are output given to the sign generating-circuit 30.

Figure 14:
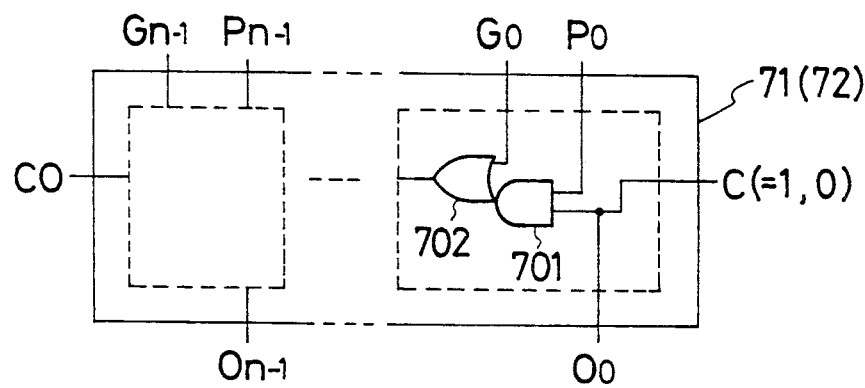
FIG. 14 shows a logic circuit of the carry-calculating circuit in the fourth embodiment.

These first and second carry-calculating circuits 71 and 72 are comprised of a logic circuit shown in FIG. 14. The circuit 71 (or 72) shown in FIG. 14 is comprised of the sets of AND gates 701 and OR gates 702 for each bit. The carry input C from a lower digit and the carry generating signal P are introduced into the AND gate 701. The output from the AND gate 701 and the carry transmitting signal G are introduced into the OR gate 702. The last carry signal $C_0$ in the highest digit of the circuit 71 (or 72) is supplied to the sign generating circuit 30 as a signal $SB_1$ (or $SB_2$).

The output-selecting circuit 40 selects either one of the two outputs from the first and second carry-calculating circuits 71 and 72, according to the selection signal D. The selected result from this circuit 40 is introduced into circuit 80. Circuit 80 executes a final operation to obtain the arithmetic result and its bit-inversion.

Figure 15:
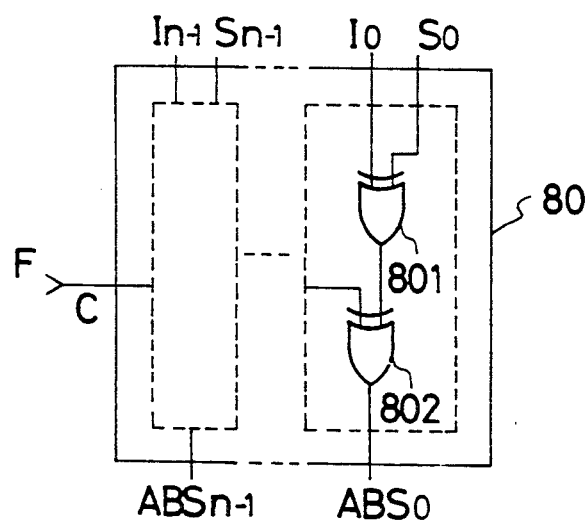
FIG. 15 shows a logic circuit of the output circuit in the fourth embodiment.

As shown in FIG. 15, the circuit 80 is comprised of the sets of two exclusive OR gates 801 and 802 for each bit. Output signal S ($S_0$, $S_1$, . . . $S_{n-1}$) from circuit 60 and the selected output I ($I_0$, $I_1$, . . . $I_{n-1}$) from the output-selecting circuit 40 for each bit are input into gate 801. The output from this gate 801 and the sign signal F from the sign generating circuit 30 are input into gate 802. Those sets of gates generate the final arithmetic result, and execute its bit-inversion when a subtraction result is negative. As a result, output $ABS_0$ $-ABS_{n-1}$ in the absolute value representation form is obtained from the circuit 80.

In general, however, the selected output I from the circuit 40 is rather delayed. It may, therefore, be better to place the exclusive OR gate 802 in front of the exclusive OR gate 801. In this case, the number of gates which are needed to form a critical path will be reduced. The bit inversion is executed first; and the final arithmetic result is generated second in this case. The logic results from both cases are the same, however.

As illustrated in detail, only the first and second carry-calculating circuits, which were involved in the first and second arithmetic circuits of the first, second and third embodiments, are provided separately in this embodiment, and the other part of the first and second arithmetic circuits are used in common. In this embodiment, therefore, the amount of additional hardware to obtain a signed absolute value output will be reduced.

Figure 5:
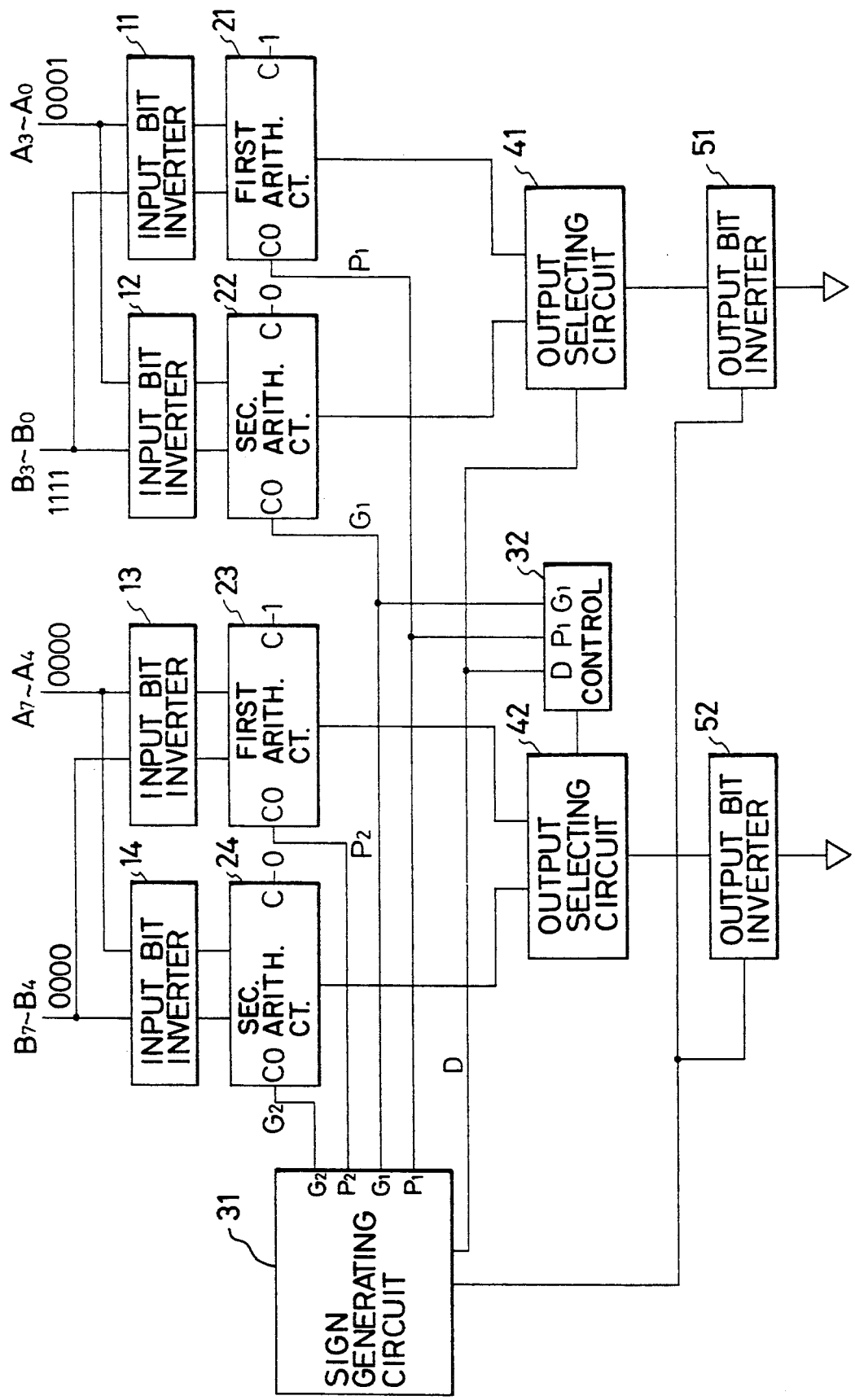
FIG. 5 is a block diagram showing the fifth embodiment of this invention.

FIG. 5 shows the fifth embodiment of this invention. The adder-subtracter of this embodiment is divided into two blocks; each corresponding to 4 bits of the 8 bit input. Therefore, two input bit inverters 11 and 13 are provided for an absolute value $|A|$; and two input bit inverters 12 and 14 are provided for an absolute value $|B|$. Of course, these inverters 11 through 14 are used in common. Furthermore, two first arithmetic circuits 21 and 23 executing ordinary subtraction by the two's complement representation form, and two second arithmetic circuits 22 and 24 executing an add operation between an inverted subtrahend and a minuend without executing add one operation are provided in this adder-subtracter. For each block, an output selecting circuit 41 or 42 and an output-bit inverter 51 or 52 are also provided. In addition to these, a sign-generating circuit 31 and a control circuit 32 to choose either one of the two arithmetic circuits 23 and 24 in the higher block are provided in this adder-subtracter.

The arithmetic operation of the adder-subtracter for signed absolute values according to the fifth embodiment will be explained below.

Assuming, input $A = 0000\ 0001_2 = 1_{10}$
input $B = 0000\ 1111_2 = 15_{10}$ the operational procedures of an addition (A+B), a subtraction (A−B), and a subtraction (B−A) by means of the adder-subtracter shown in FIG. 5 will be explained separately.

In the Case of Addition (A+B)

In this case, the operational result from the second arithmetic circuit 22 of the lower block is selected by the output selecting circuit 41, as shown in FIG. 6a. Thus the added result 0000 is output for the lower 4 digits.

At the same time, the signal $P_1$ and $G_1$ for a carry calculation are output respectively from the first and the second arithmetic circuits 21 and 22, as shown in FIG. 5. These signals are then supplied to the control circuit 32 to produce a control signal for the output selecting circuit 42. In this case, the output of the first arithmetic circuit 23 will be chosen to be output in the output selecting circuit, according to the control signal. This output contains a carry from a lower digit. Thus, the added result 0001 is output from the second block of this adder-subtracter.

As a result, a sum C is obtained as $C = 0001\ 0000_2 = 16_{10}$ for addition (A+B).

Basically the circuit structure shown in FIG. 6a is the same one as the carry select adder, known as a high-speed adder. This means that the adder-subtracter shown in FIG. 5 works as the carry select adder in addition. It is therefore possible to execute high-speed addition by the adder-subtracter shown in FIG. 5 without, adding special hardware.

In the Case of Subtraction (A−B)

Figure 6B:
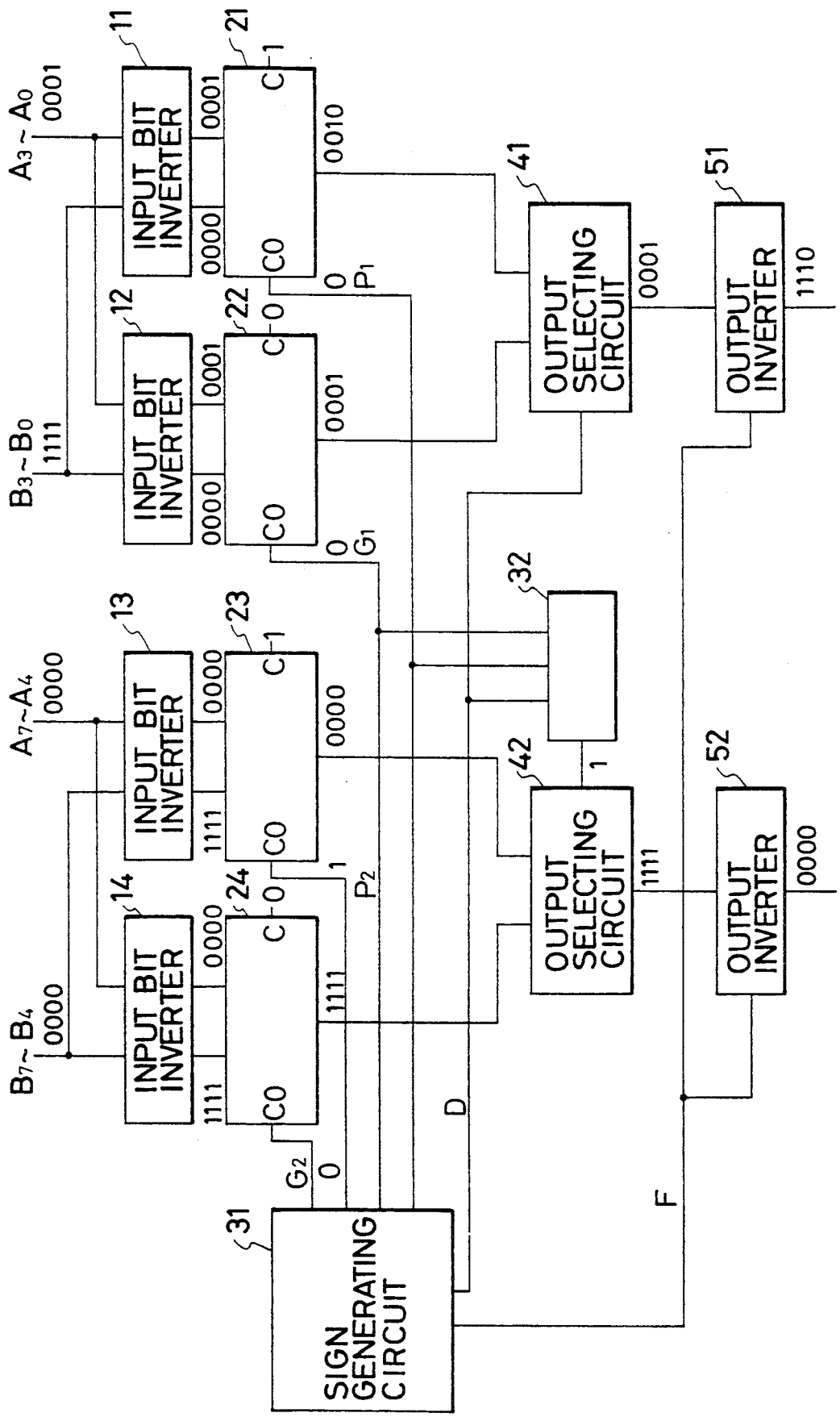

In this subtraction, the absolute value of B is greater than that of A. Therefore, the output from the first arithmetic circuit 21 in the lower block may be thought of as the base for calculation as shown in FIG. 6b. This is because the basic idea of a subtraction is found in the operation 'an inverted subtrahend is added to a minuend, and then one is added to the result'.

In this case, the operational result from the first arithmetic circuit 21 is 0010, and the carry $P_1$ is 0. The output from the second arithmetic circuit 24 is therefore expected to be selected as the operational result in the higher block. This is because the operational result from the circuit 24 does not contain a carry.

In this case, however, the carry from the second arithmetic circuit 24 in the higher block, that is, the carry signal $G_2$ in the highest digit, is 0. This shows that the sign of the subtraction may be negative.

The 'circuit not executing an add one operation' should be chosen when the sign is negative. The output 0001 from the second arithmetic circuit 22 should therefore be chosen for the lower 4 digits, by the output selecting circuit 41. This output is then supplied to the output bit inverter 51. At the same time, the carry $G_1$ in the second arithmetic circuit 22 for the lower 4 digits becomes 0. In the higher 4 digits, therefore, the operational result 1111 from the second arithmetic circuit 24 should be chosen by the output selecting circuit 42 according to the instruction from the control circuit 32. This is because circuit 24 is the one in which an add-one pperation is not executed. The selected result is then supplied to the output bit inverter 52.

A bit inversion is performed upon the operational result 1111 001 supplied to the output bit inverters 51 and 52, to obtain the last subtracted result $C = 0000\ 1110_2 = 14_{10}$. At the same time, a negative sign is output from the sign generating circuit 31 to give the signed absolute value $-14_{10}$.

In the Case of Subtraction (B−A)

Figure 6C:
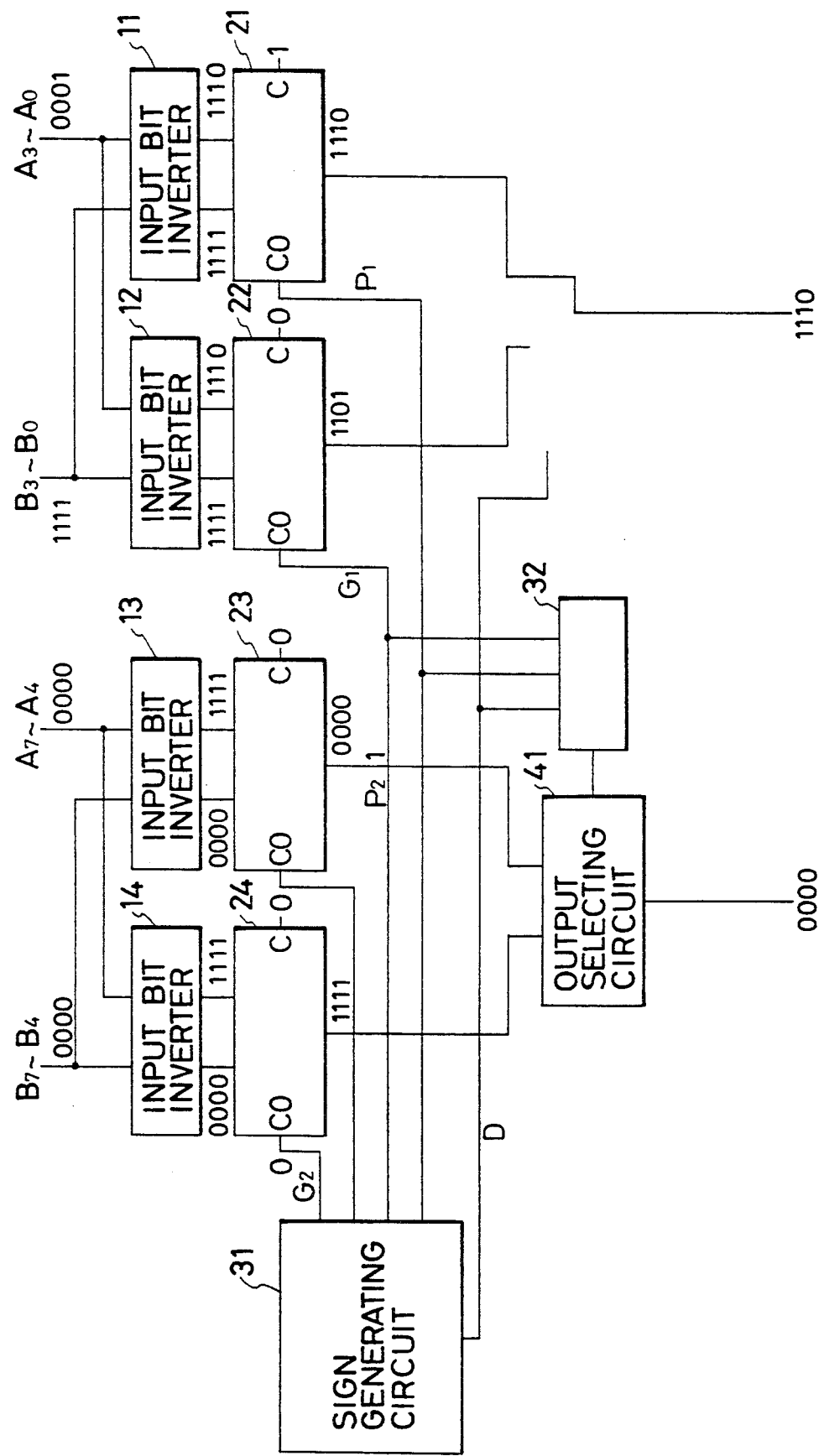

The basic idea of a subtraction operation is that an inverted subtrahend is added to a minuend, and then 1 is added to the result. The operational result from the first arithmetic circuit 21 should therefore be thought of as the base. The carry $P_1$ of the first arithmetic circuit 21 is 1 in this case as shown in FIG. 6c. It is therefore expected that the operational result from the first arithmetic circuit 23 is chosen as the output for the higher 4 bits. This is because circuit 23 has a carry input.

The operational result could be found to be positive, because the carry $P_2$ from the first arithmetic circuit 23 is 1 in this case.

Therefore, the output 1110 from the first arithmetic circuit 21 for the lower 4 bit-block, and the output 0000 from the first arithmetic circuit 23 for the higher 4-bit block are selected to be output, to obtain the operational result $C = 0000\ 1110_2 = 14_{10}$.

As mentioned above, addition or subtraction in the signed absolute value representation form can be carried out using two arithmetic circuits in the two's complement representation form in this invention. One of the circuits is the one in which 1 is added to its carry input, and the other is the one in which 1 is not added to its carry input. These two circuits are operated in parallel to each other. One of the outputs from the two arithmetic circuits should then be selected as an output according to the signs of the operational result; and a bit-inversion of the output may be executed if the result is negative.

Figure 16:
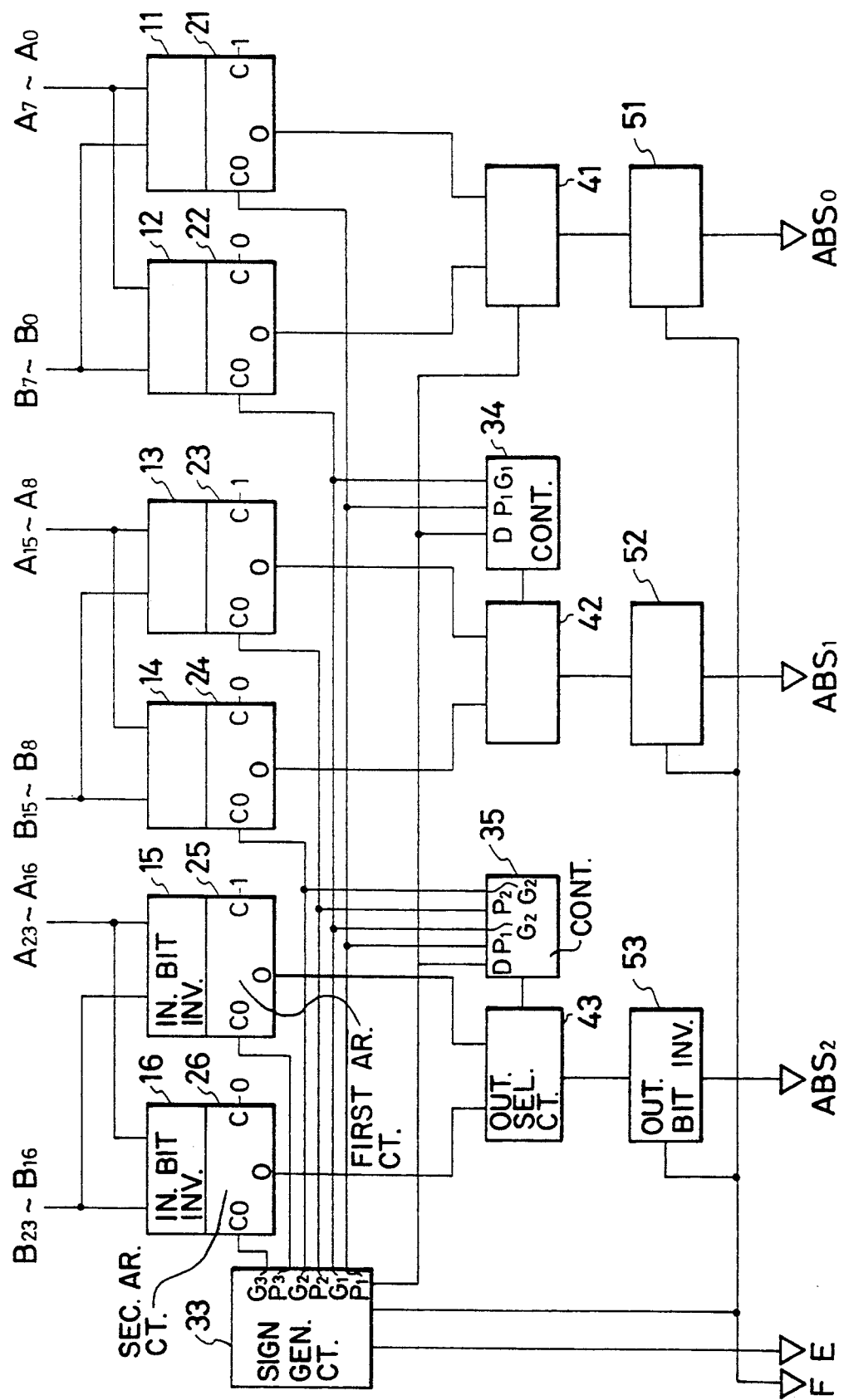
FIG. 16 shows a block diagram showing the sixth embodiment of this invention.

FIG. 16 shows the sixth embodiment of this invention. In this case the input is comprised of 24 bits divided into three blocks of 8 bits ($A_0-A_7$; $B_0-B_7$), ($A_8-A_{15}$; $B_8-B_{15}$), and ($A_{15}-A_{23}$; $B_{15}-B_{23}$) inside the adder-subtracter. This device is comprised of three first arithmetic circuits 21, 23, and 25 for each block; and three second arithmetic circuits 22, 24, and 26. These first arithmetic circuits are the ones in which a carry input from a lower digit is supplied in a subtraction as described above. In the same way, those second arithmetic circuits are the ones in which a carry input is not supplied from lower digit in a subtraction. The sign-generating circuit 33, and the control circuits 34 and 35 provide instructions as to which of the outputs from the first and second circuits in each block should be selected as an output. This selection is carried out in the output-selecting circuits 41, 42, and 43. The selected results may be inverted by the output bit-inverters 51, 52, and 53 when the operational result found by the sign signal F is negative. As a result, the operational result $ABS_2$ $ABS_1$ $ABS_0$ in the absolute value representation form is obtained with a sign.

Figure 17:
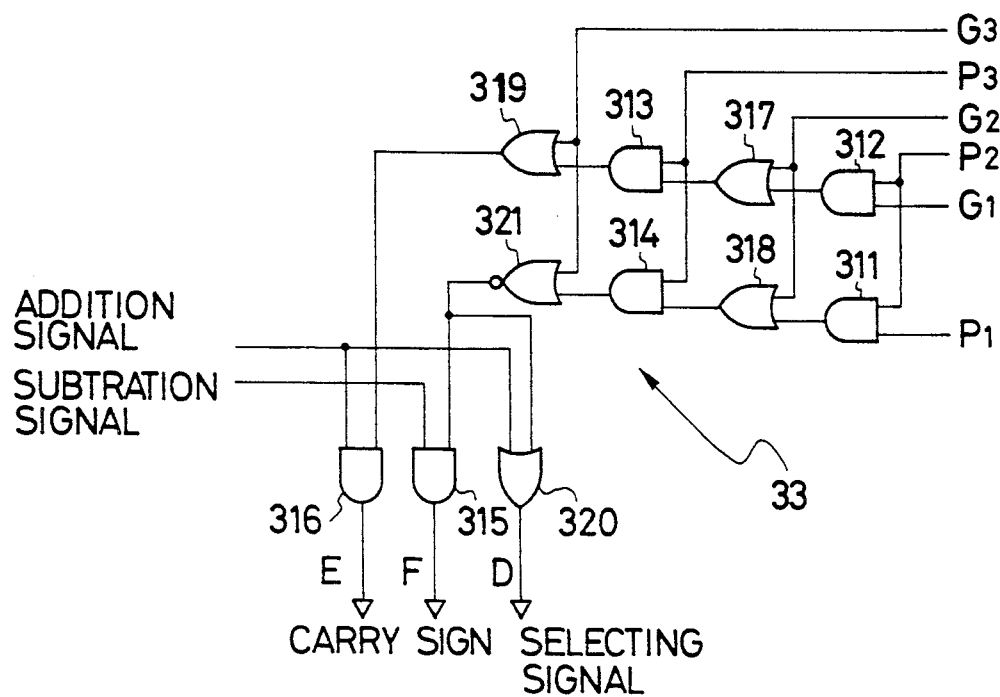
FIG. 17 shows a logic circuit of the sign-generating circuit in the sixth embodiment.

As shown in FIG. 17, the sign generating circuit 33 is comprised of the AND gates 311–316; the OR gates 317–320; and the NOR gate 321. The carry $P_1$, $P_2$, and $P_3$ from the first arithmetic circuits 21, 23, and 25 in the three blocks are input to circuit 33, as shown in the figure. The carry $G_1$, $G_2$, and $G_3$ from the second arithmetic circuits 22, 24, and 26 are also input to circuit 33, as shown in the figure.

Figure 18:
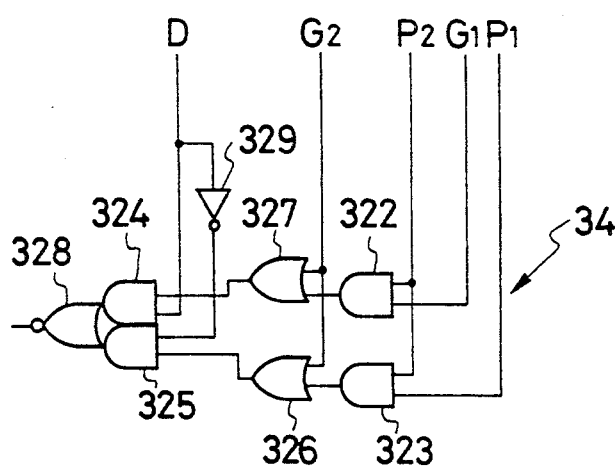
FIG. 18 shows a logic circuit of the control circuit in the sixth embodiment.

The control circuit 34 is comprised of the AND gates 322–325; OR gates 326, 327; NOR gate 328; and inverter 329, as shown, in FIG. 18.

Figure 19:
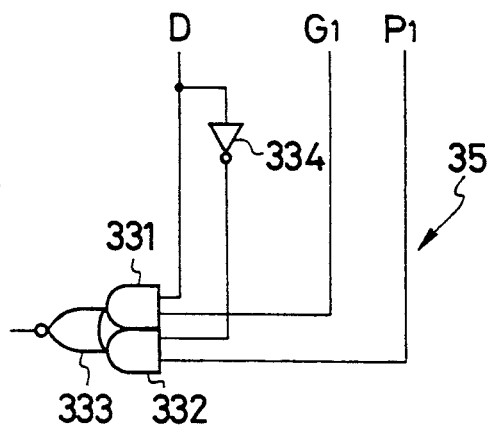
FIG. 19 shows a logic circuit of th eother control circuit in the sixth embodiment.

The other control circuit 35 is also comprised of the AND gates 331, 332; NOR gate 333; and inverter 334, as shown in FIG. 19.

Figure 20:
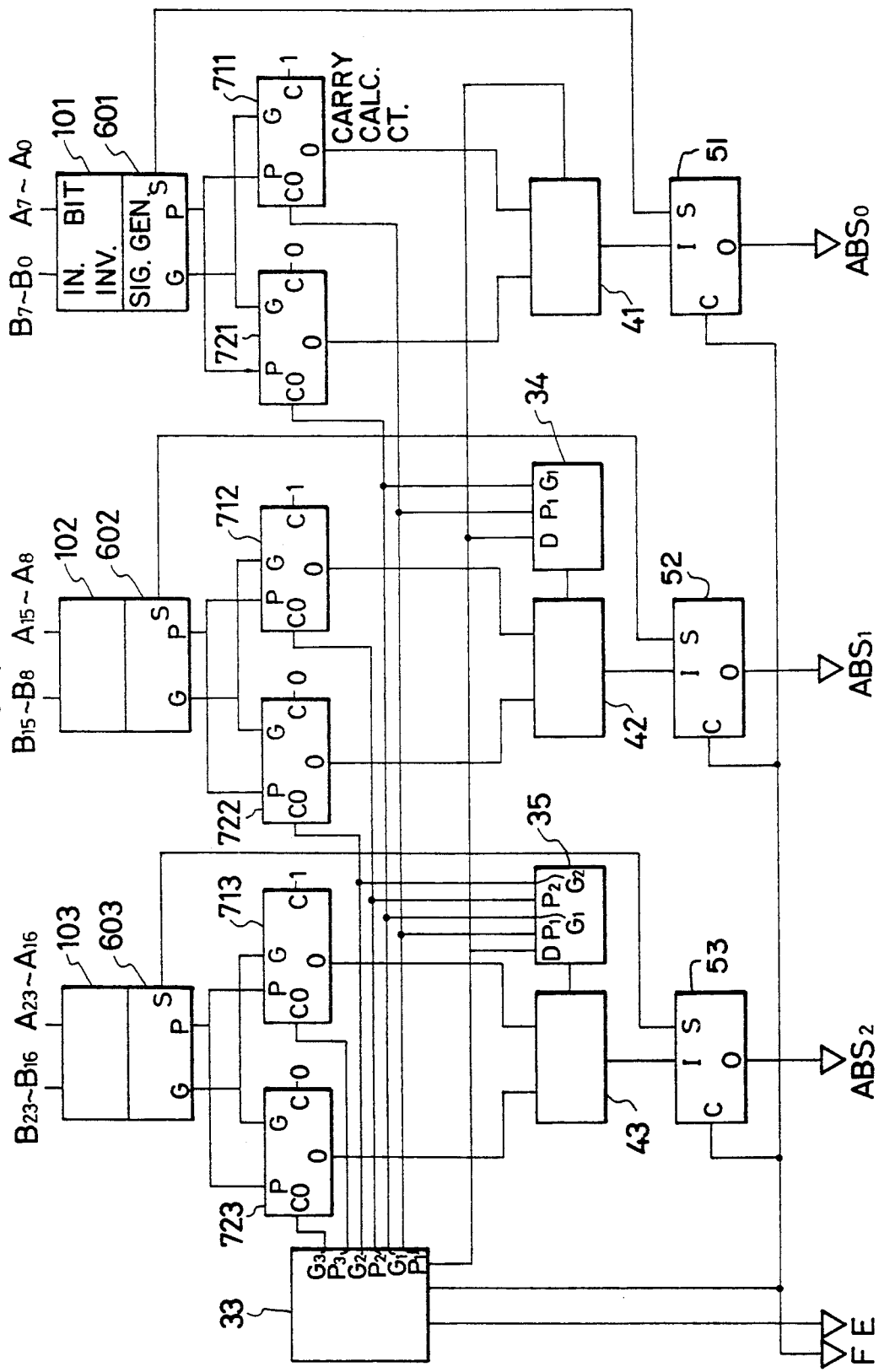
FIG. 20 shows a block diagram of the seventh embodiment of this invention.

FIG. 20 shows the seventh embodiment of this invention. In this embodiment, the input signal in 24 bits is divided into three blocks of 8 bits each in the same way as illustrated in the sixth embodiment. For each block in this embodiment, however, the circuit of the fourth embodiment shown in FIG. 4 is supplied. Therefore, an input bit inverter 101 (102 or 103); a signal-generating circuit 601 (602 or 603) for generating a carry generation signal and a carry transmission signal; a first carry calculating circuit 711 (712 or 713) having a carry from a lower digit; a second carry-calculating circuit 721 (722 or 723) having no carry from a lower digit; an output-selecting circuit 41 (42 or 43); and an output circuit 51 (52 or 53) for generating an added result, and executing a bit-inversion are provided for each block. In this embodiment, a sign-generating circuit 33 and two control circuits 34 and 35 are also provided, as shown in FIG. 20.

The adder-subtracter of this embodiment works for every block in a way similar to that illustrated in the fourth embodiment. As a result, a sign signal F is obtained from the sign generating circuit 31 and an absolute value representing the result of addition is obtained from the output circuits 51, 52, and 53.

In summary, the two kinds of operations needed for subtraction are executed in parallel in this invention. As a result, the executing speed of the adder-subtracter according to this invention is greatly improved, unlike the prior arts, in which a correction should be made after an operation; or in which a size comparison should be made between a subtrahend and a minuend before an operation. A second arithmetic circuit, an output-selecting circuit, and an output bit inverter are needed to execute this invention. On the other hand, one of the two adder-subtracters which is required to execute a parallel operation in the prior art device; or the correction-circuit and the size comparator used in prior art devices are not needed in this invention. Therefore, the total increase in additional hardware required to execute this invention is smaller than that of prior art devices. The increase in hardware is especially small in the fourth embodiment of this invention. Furthermore, the operational speed of the adder-subtracter according to the fifth, sixth, and seventh embodiments of this invention is very high, especially in addition functions. This is because these devices work as if these are carry-select adders in addition. It is therefore possible to improve the operational speed in addition, without adding special hardware in this invention.

Various modification will become possible for those skilled in the art after being provided with the teachings of the present disclosure without departing from the scope thereof.

What is claimed is:

1. An adder-subtracter for signed absolute values in which addition or subtraction of signed absolute values is executed in two's complement representation form and an executed result is output as a signed absolute value, the adder-subtracter comprising:

a first arithmetic circuit for executing an ordinary subtractive operation in said two's complement representation form in which 1 is added to an addition result between an ivnerted subtrahend and a minuend in subtraction;

a second arithmetic circuit for executing addition between an inverted subtrahend and a minuend in subtraction without adding 1 to an executed result;

a sign-generating circuit, coupled to said first and second arithmetic circuits, for determining a sign of a subtraction result in said first arithmetic circuit and said second arithmetic circuit;

an output-selecting circuit for selecting either one of two outputs from said first and second arithmetic circuits, according to an output from said sign-generating circuit; and an output inverter for executing bit-inversion of an output from said output-selecting circuit, according to another output from said sign-generating circuit.

2. The adder-subtracter as claimed in claim 1, wherein said first arithmetic circuit has an input bit-inverter.

3. The adder-subtracter as claimed in claim 1, wherein said first arithmetic circuit has an extended digit in a higher position of input digits, and an output from said extended digit is introduced into said sign-generating circuit to determine a sign of an operation.

4. The adder-subtracter as claimed in claim 1, wherein said sign-generating circuit determines said sign of said operation by introducing an output from a highest digit of said first arithmetic circuit.

5. The adder-subtracter as claimed in claim 1, wherein said first arithmetic circuit, second arithmetic circuit, output-selecting circuit, and output inverter are provided respectively for each of bit blocks comprised of a plurality of bits divided from input signals.

6. The adder-subtracter as claimed in claim 1, further comprising an arithmetic operation circuit including said first and second arithmetic circuits.

7. An adder-subtracter for signed absolute values, in which addition or subtraction of signed absolute values is executed in two's complement representation form and an executed result is output as a signed absolute value, the adder-subtracter comprising:

an input bit-inverter from which an addend is output without inversion in addition and a subtrahend is output with inversion in subtraction;

a first arithmetic circuit for executing an ordinary subtractive operation in said two's complement representation in which 1 is added to a result of adding between an output from said input bit-inverter and an augend or a minuend in subtraction;

a second arithmetic circuit for executing addition between another output from said input-bit inverter and an augend or a minuend in subtraction without adding 1 to an executed result;

a sign-generating circuit, coupled to said first and second arithmetic circuits, for determining whether an operation is addition or subtraction and for determining a sign of an operational result from said first arithmetic circuit;

an output-selecting circuit, coupled to said sign-generating circuit and to said first and second arithmetic circuits, for selecting an output from said second arithmetic circuit to be output when an operation is determined to be addition or when an oepration is subtraction and said operational result in said first arithmetic circuit is negative as determined by said sign-generating circuit, and for selecting an output from said first arithmetic circuit to be output in other situations; and an output bit-inverter, for bit-inverting an output from said output-selecting circuit to be output when an operation is determined to be a subtraction and said output from said first arithmetic circuit is negative as determined by said sign-generating circuit, and for not bit-inverting an output from said output-selecting circuit in other situations.

8. The adder-subtracter as claimed in claim 7, wherein said input bit-inverter, first arithmetic circuit, second arithmetic circuit, output-selecting circuit, and output bit-inverter are provided respectively for each of bit blocks comprised of a plurality of bits divided from input signals.

9. The adder-subtracter as claimed in claim 7, further comprising an arithmetic operation circuit including said first and second arithmetic circuits.

10. An adder-subtracter for signed absolute values in which addition or subtraction of signed absolute values is executed in two's complement representation form and an executed result is output as sign-magnitude representation, the adder-subtracter comprising:

an input bit-inverter from which an addend is output without inversion in addition and a subtrahend is output with inversion in subtraction;

a signal-generating circuit for generating a carry-propagation signal and carry generation signal of each digit according to an output from said bit-inverter and an augend or a minuend;

a first carry-calculating circuit in which a carry operation to each bit of input from said signal-generating circuit is executed with a carry from a lower digit;

a second carry-calculating circuit in which a carry operation to each bit of input from said signal-generating circuit is executed without a carry from a lower digit;

a sign-generating circuit responsive to carrys from highest digits of said first and second carry-calculating circuits for determining signs of subtraction results;

an output-selecting circuit for selecting either one of outputs form said first and second carry-calculating circuits according to an output from said sign generating-circuit; and an output circuit, to which either one of said outputs from said first and second carry-calculating circuits selected by said output-selecting circuit and a carry generated by said signal-generating circuit are input, for producing a final adding result, and for bit-inverting an input carry or adding result when a sign of subtraction is determined to be negative.

11. The adder-subtracter as claimed in claim 10, wherein said output circuit executes bit-inversion of said input carry first, and then produces an adding result by using an inverted sum of each bit when a subtractive result determined by said sign-generating circuit is negative.

12. The adder-subtracter as claimed in claim 10, wherein said input bit-inverter, signal-generating circuit, first carry-calculating circuit, second carry-calculating circuit, output-selecting circuit, and output circuit are provided respectively for each of bit blocks comprised of a plurality of bits divided from input signals.

* * * * *